United States Patent
Tsubouchi

(10) Patent No.: US 7,207,261 B2
(45) Date of Patent: Apr. 24, 2007

(54) VACUUM-OPERATED BOOSTER

(75) Inventor: Kaoru Tsubouchi, Toyota (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 0 days.

(21) Appl. No.: 11/269,843

(22) Filed: Nov. 9, 2005

(65) Prior Publication Data

US 2006/0112819 A1   Jun. 1, 2006

(30) Foreign Application Priority Data

Nov. 30, 2004   (JP) .............................. 2004-346992

(51) Int. Cl.
*B60T 13/573*   (2006.01)
*B60T 13/52*   (2006.01)

(52) U.S. Cl. .................................. 91/369.2

(58) Field of Classification Search ............... 91/369.1, 91/369.2, 369.3, 369.4, 376 R
See application file for complete search history.

(56) References Cited

U.S. PATENT DOCUMENTS 4,611,526 A * 9/1986 Arino et al. ............... 91/369.2
5,146,837 A * 9/1992 Inoue ......................... 91/369.2
6,397,723 B1 * 6/2002 Suwa ......................... 91/369.2
6,802,240 B2 * 10/2004 Kobayashi ................. 91/369.2

FOREIGN PATENT DOCUMENTS

JP   10-230840   9/1998

* cited by examiner

*Primary Examiner*—Thomas E. Lazo
(74) *Attorney, Agent, or Firm*—Buchanan Ingersoll & Rooney PC

(57) ABSTRACT

Reaction force from a reaction member is divided and transmitted to a front shaft portion of a plunger via abutment member and to a flange portion of the plunger via a spring unit. The spring unit includes a tubular first holding member assembled to the front shaft portion of the plunger and being engageable, at its front end portion, with the reaction member, a second holding ember assembled to a rear end portion of the first holding member and having a rear end portion which extends rearward from the first holding member for engagement with the flange portion, and Belleville springs held between the first and second holding members. When the reaction force transmitted from the reaction member to the first holding member exceeds the load of the springs, the first holding member moves while compressing the springs and engages with a stepped portion of a valve body.

8 Claims, 4 Drawing Sheets

VACUUM-OPERATED BOOSTER

BACKGROUND OF THE INVENTION

1. Field of the Invention

The present invention relates to a vacuum-operated booster which has a movable diaphragm dividing the interior of a housing into a constant-pressure chamber and a variable-pressure chamber and which boosts an input by means of atmospheric pressure difference between the constant-pressure chamber and the variable-pressure chamber and outputs the boosted force.

2. Description of the Related Art

A vacuum-operated booster of the above-described type is disclosed in, for example, Japanese Patent Application Laid-Open (kokai) No. H10-230840. In the disclosed vacuum-operated booster, a valve body, which is connected to the movable diaphragm dividing the interior of the housing into a constant-pressure chamber and a variable-pressure chamber, has an axial hole, and a valve mechanism is built in the axial hole. The valve mechanism includes, as constituent elements, an input shaft, which is axially movable with respect to the valve body, a plunger connected to a front end portion of the input shaft, and a valve seat provided at the rear end of the plunger. Further, a reaction member, with which a front end portion of the plunger is engageable and which is axially movable with respect to the valve body, and an output shaft whose rear end portion is in engagement with the front face of the reaction member and which is axially movable with respect to the valve body, are assembled into the axial hole. When an input is applied to the input shaft, an output is generated at the output shaft, and a reaction force of the output is transmitted from the rear face of the reaction member to the valve body and the plunger via a reaction force dividing mechanism.

In the vacuum-operated booster disclosed in the above-mentioned publication, the valve body has a portion (pressure receiving area A1) which receives the reaction force directly from a radially outer portion of the rear face of the reaction member; and the plunger has a portion (pressure receiving area A2) which receives the reaction force directly from a radially inner portion of the rear face of the reaction member and a portion (pressure receiving area A3) which receives the reaction force from a radially intermediate portion of the rear face of the reaction member via a reaction force transmission/cutoff mechanism. The reaction force dividing mechanism, which transmits the reaction force of the output from the rear face of the reaction member to the valve body and the plunger, divides the reaction force from the reaction member into three forces (at a ratio corresponding to the pressure receiving area ratio A1:A2:A3).

The reaction force transmission/cutoff mechanism includes a sleeve, a spring seat, and a compression spring. The sleeve is fitted into a front shaft portion of the plunger such that the sleeve can telescopically move in the axial direction. A front end portion of the sleeve is engageable with the intermediate portion of the rear face of the reaction member, and the rear end of the sleeve is engageable, at its outer peripheral edge portion, with a stepped portion of the valve body. The spring seat is fixed to the plunger to be located rearward of the sleeve. The compression spring is assembled to the outer periphery of the plunger to be held between the spring seat and the sleeve with a predetermined load applied thereto.

Therefore, in the vacuum-operated booster disclosed in the above-mentioned publication, irrespective of the magnitude of the input, the valve body always receives reaction force directly from the reaction member at a predetermined division ratio (A1/(A1+A2+A3)). Further, during a low-input operation, which takes place until the sleeve moves rearward against the load of the compression spring and comes into engagement with the stepped portion of the valve body due to the reaction force that the sleeve receives from the reaction member, the plunger receives the reaction force directly from the reaction member and also receives the reaction force from the reaction member via the reaction force transmission/cutoff mechanism. However, during a high-input operation, which takes places after the sleeve comes into engagement with the stepped portion of the valve body, the reaction force transmitted from the reaction member via the reaction force transmission/cutoff mechanism is transmitted to the stepped portion of the valve body, so that the plunger becomes unable to receive the reaction force from the reaction member via the reaction force transmission/cutoff mechanism despite the plunger receiving the reaction force directly from the reaction member. Accordingly, in the vacuum-operated booster, the servo ratio (output/input) at the time of low-input operation becomes a low servo ratio ((A1+A2+A3)/(A2+A3)), and the servo ratio at the time of high-input operation becomes a high servo ratio ((A1+A2+A3)/A2).

Incidentally, since the vacuum-operated booster disclosed in the above-mentioned publication employs a structure in which the valve body always receives reaction force directly from the reaction member at a predetermined division ratio (A1/(A1+A2+A3)), the servo ratio at the time of low-input operation (low-load serve region) cannot be lowered to the vicinity of 1. Therefore, in the case where a vehicle is equipped with the above-described vacuum-operated booster and employs a brake system which increases electric power regeneration efficiency, increasing the electric power regeneration efficiency to a sufficient level is difficult.

Moreover, in the vacuum-operated booster disclosed in the above-mentioned publication, when the sleeve of the reaction force transmission/cutoff mechanism moves rearward against the load of the compression spring, an intermediate portion of the compression spring may be caught by (come into engagement with) the spring seat fixed to the plunger or the plunger itself, which may result in generation of noise and hinder smooth operation. Further, since the spring seat, the compression spring, and the sleeve of the reaction force transmission/cutoff mechanism must be individually assembled to the plunger, ease of assembly is poor.

SUMMARY OF THE INVENTION

An object of the present invention is to provide a vacuum-operated booster whose servo ratio in a low-load servo region can be lowered to approximately 1.

The present invention provides a vacuum-operated booster of the above-described type improved such that the reaction force dividing mechanism can transmit all reaction force of output of the output shaft only to the plunger in a low-load servo region in which the output of the output shaft is equal to or less than a set value, and can transmit the reaction force to the valve body and the plunger while dividing the reaction force therebetween at a set ratio in a high-load servo region in which the output of the output shaft is greater than the set value.

In the vacuum-operated booster of the present invention, when the booster is in the low-load servo region in which the output of the output shaft is equal to or less than the set value, the reaction force dividing mechanism can transmit all reaction force of output of the output shaft only to the plunger. Therefore, in the low-load servo region in which the output of the output shaft is equal to or less than the set value, the servo ratio (output/input) becomes approximately 1. Accordingly, in a vehicle which is equipped with the above vacuum-operated booster and employs a brake system which increases electric power regeneration efficiency, the electric power regeneration efficiency can be increased to a sufficient level.

Further, when the booster is in the high-load servo region in which the output of the output shaft is greater than the set value, the reaction force dividing mechanism can transmit the reaction force to the valve body and the plunger while dividing the reaction force therebetween at the set ratio. Therefore, in the high-load servo region in which the output of the output shaft is greater than the set value, the servo ratio (output/input) increases to a value determined in accordance with the above-described set ratio, whereby the input is boosted at the increased servo ratio.

When the present invention is practiced, a reaction restricting member may be interposed between the output shaft and the valve body so as to elastically restrict transmission of the reaction force of the output generated at the output shaft to the reaction member when the output of the output shaft is equal to or less than a set value. The reaction restricting member may be a plate-shaped elastic member (e.g., plate spring) provided between the output shaft and a front end portion of the valve body. In this case, at the beginning of operation of the vacuum-operated booster, the reaction restricting member functions, whereby a jumping output characteristic is obtained in which the output increases by a predetermined amount without any increase in the input. Therefore, the vacuum-operated booster can provide good operation feeling.

When the present invention is practiced, the reaction force dividing mechanism may include a spring unit which is disposed on the outer circumference of the front end portion of the plunger and axially movable with respect to the valve body. The spring unit includes a tubular first holding member assembled to a front shaft portion of the plunger so as to be telescopically movable in the axial direction, the first holding member having a front end portion which comes into engagement with the reaction member and is equal in diameter to the reaction member; a second holding member assembled, in an axially movable manner, to the outer circumference of a rear end portion of the first holding member such that the second holding member is prevented from coming off the rear end portion, the second holding member having a rear end portion which projects rearward from the first holding member and comes into engagement with a portion of the plunger; and a spring assembled to the outer circumference of the tubular portion of the first holding member and held at a predetermined load between the first and second holding members. When the reaction force transmitted from the reaction member to the front end portion of the first holding member exceeds the load of the spring, the first holding member axially moves while compressing the spring, and comes into engagement with a stepped portion of the valve body.

In this case, in the low-load servo region; i.e., until the first holding member axially moves against the load of the spring and comes into engagement with the stepped portion of the valve body due to the reaction force received from the reaction member, the plunger receives the reaction force directly from the reaction member without mediation of the spring unit, and also receives the reaction force from the reaction member via the spring unit. However, in the high-load servo region; i.e., after the first holding member of the spring unit comes into engagement with the stepped portion of the valve body, the plunger does not receive the reaction force from the reaction member via the spring unit, although the plunger receives the reaction force directly from the reaction member without mediation of the spring unit.

Incidentally, in the vacuum-operated booster of the present invention, the first holding member of the spring unit is formed into a tubular shape, and is fitted onto the front shaft portion of the plunger in an axially movable condition. Further, the second holding member of the spring unit is attached to the outer circumference of the rear end portion of the first holding member such that the second holding member is movable in the axial direction and is prevented from coming off the rear end portion. Therefore, the spring—which is assembled to the outer circumference of the tubular portion of the first holding member and is held at the predetermined load between the first and second holding members—does not engage, at its intermediate portion, with the second holding member or the plunger, which engagement would otherwise occur when the first holding member axially moves while compressing the spring. Accordingly, the present vacuum-operated booster can prevent generation of noise or operation failure stemming from the catching or engagement of the spring, to thereby ensure silent and smooth operation.

In the vacuum-operated booster of the present embodiment, the second holding member of the spring unit is attached to the outer circumference of the rear end portion of the first holding member such that the second holding member is movable in the axial direction and is prevented from coming off the rear end portion. Further, the spring is assembled to the outer circumference of the tubular portion of the first holding member and is held at the predetermined load between the first and second holding members. Therefore, at the time of assembly of the vacuum-operated booster, after the spring is assembled to the outer circumference of the tubular portion of the first holding member, the second holding member can be attached to the outer circumference of the rear end portion of the first holding member such that the second holding member is prevented from coming off the rear end portion. By virtue of this configuration, the first holding member, the second holding member, and the spring of the spring unit can be unified, and thus, the easiness of assembly of the spring unit can be enhanced.

When the present invention is practiced, the spring may be a plurality of stacked Belleville springs. In this case, through utilization of the characteristics of the Belleville springs such that their spring constant changes in accordance with the manner of deformation thereof, the characteristic of high load-low spring constant can be easily realized. Accordingly, in the vacuum-operated booster of the present invention, at the time of rapid operation in the high-load servo region in which the load of the Belleville springs increases, the plunger advances a long distance in relation to the valve body, and introduction of air from the valve mechanism to the variable-pressure chamber is facilitated, whereby operation response can be enhanced.

When the present invention is practiced, the first holding member, the second holding member, and the spring of the spring unit may be united in such a manner that the spring is assembled to the outer circumference of the tubular portion of the first holding member; the second holding member is fitted onto the outer circumference of the rear end portion of the first holding member; and the rear end of the first holding member is plastically deformed radially outward so as to prevent the spring and the second holding member from coming off the first holding member. In this case, the structure of the spring unit can be simplified, and the spring unit can be fabricated at low cost.

When the present invention is practiced, the front end portion of the plunger may be formed of a different member separate from the remaining portion of the plunger, the different member being formed into the form of a stepped cylindrical column. In this case, the pressure receiving area, through which the plunger front end portion formed of the different member receives reaction force from the reaction member, and the pressure receiving area, through which the first holding member of the spring unit receives reaction force from the reaction member, can be changed and set by merely changing the shape of the plunger front end portion formed of the different member. Therefore, the high servo ratio obtained in the high-load servo region can be easily changed and set.

When the present invention is practiced, the reaction member may be axially movable in contact with the inner wall of the axial hole of the valve body via a single annular projection formed on the outer periphery of the reaction member. Therefore, axial movement of the reaction member in relation to the inner wall of the axial hole of the valve body (operation in the low-load servo region) becomes smooth, whereby operation of the vacuum-operated booster in the low-load servo region can be made smooth.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
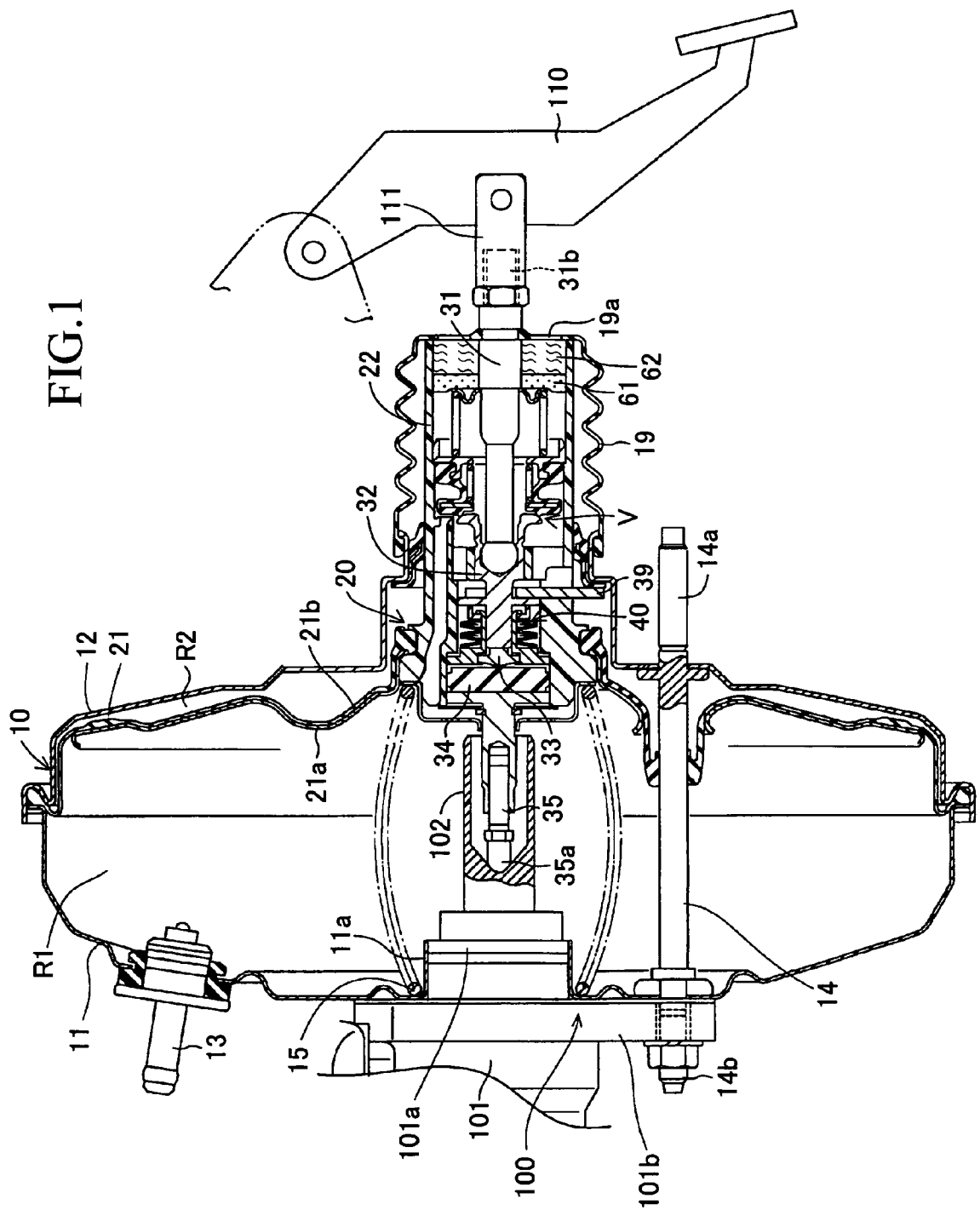
FIG. 1 is a sectional view showing a vacuum-operated booster according to an embodiment of the present invention.
Figure 2:
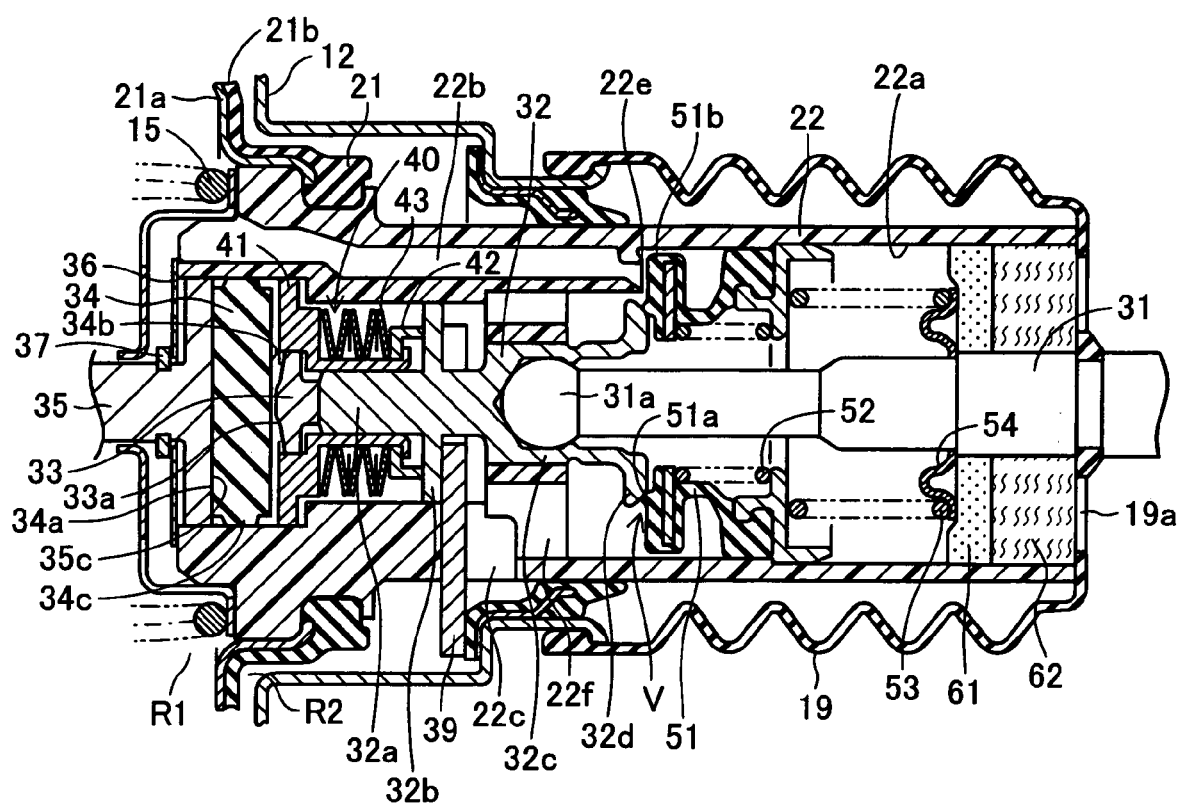
FIG. 2 is an enlarged sectional view showing the valve body shown FIG. 1 and components assembled thereto.
Figure 3:
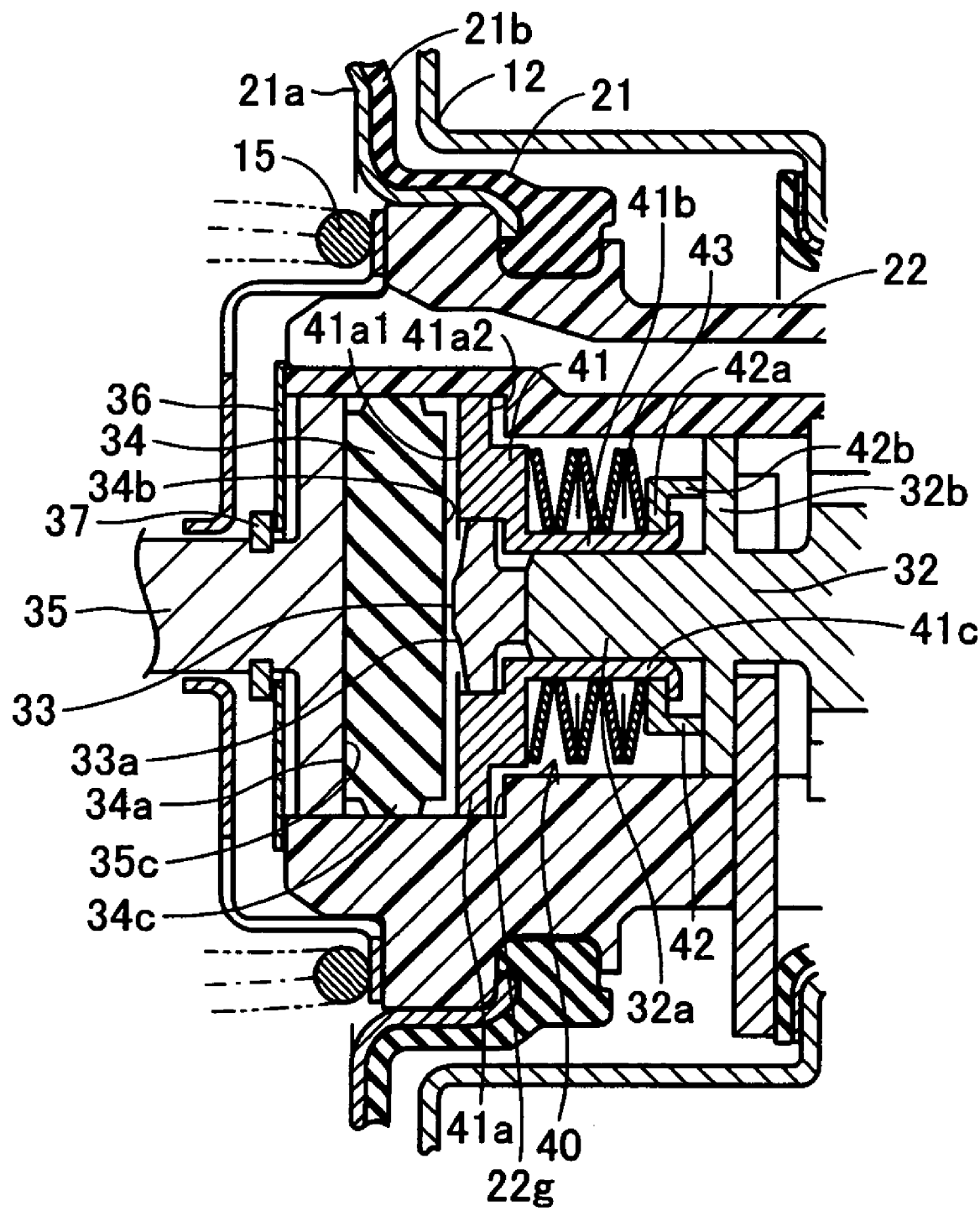
FIG. 3 is an enlarged sectional view showing a plunger, an abutment member, a reaction member, an output shaft, a spring unit, a valve body, etc. shown in FIG. 2.

An embodiment of the present invention will next be described in detail with reference to the drawings. FIGS. 1 to 3 show an embodiment in which the present invention is applied to a vacuum-operated booster of a brake system for a vehicle. In the vacuum-operated booster of the present embodiment, a power piston 20 including a movable diaphragm 21 and a valve body 22 is assembled to a housing 10, and the interior of the housing 10 is divided into a constant-pressure chamber R1 and a variable-pressure chamber R2 by means of the movable diaphragm 21.

As shown in FIG. 1, the housing 10 includes a front shell 11 and a rear shell 12, and is provided with a vacuum (negative-pressure) introduction pipe 13 for establishing communication between the constant-pressure chamber R1 and a vacuum source (e.g., the intake manifold of an unillustrated engine) at all times. The housing 10 is fixedly attached to a stationary member; i.e., a vehicular body (not shown), by means of threaded rear end portions 14a of a plurality of tie rods 14 (FIG. 1 shows only a single tie rod 14). The tie rods 14 extend airtightly through the housing 10 and the movable diaphragm 21. Notably, a brake master cylinder 100 is fixedly connected to threaded front end portions 14b of the tie rods 14.

A rear end portion 101a of a cylinder body 101 of the brake master cylinder 100 airtightly extends through a central cylinder portion 11a of the front shell 11 and projects into the constant-pressure chamber R1. The rear surface of a flange portion 101b of the cylinder body 101 abuts the front surface of the front shell 11. A piston 102 of the brake master cylinder 100 projects rearward into the constant-pressure chamber R1 from the cylinder body 101 and is pushed frontward by means of a front end rod portion 35a of an output shaft 35, which will be described later.

The movable diaphragm 21 of the power piston 20 includes an annular metal plate 21a and an annular rubber diaphragm 21b and is disposed within the housing 10 such that the movable diaphragm 21 can move in a front-rear direction (the axial direction of the power piston 20). The diaphragm 21b is airtightly sandwiched, at its annular bead portion formed at its outer peripheral edge, between the front shell 11 and a peripheral bend edge portion of the rear shell 12. The diaphragm 21b, together with an inner peripheral portion of the plate 21a, is airtightly and fixedly fitted, at its annular bead portion formed at its inner peripheral edge, into a circumferential groove formed on the outer circumference of a front end portion of the valve body 22.

The valve body 22 of the power piston 20 is a hollow body formed of resin and connected to an inner peripheral portion of the movable diaphragm 21. An intermediate portion of the valve body 22 formed into a cylindrical shape is airtightly assembled to the rear shell 12 of the housing 10 such that the valve body 22 can move in the front-rear direction. The valve body 22 is biased or urged rearward by means of a return spring 15 disposed between the valve body 22 and the front shell 11 of the housing 10. Notably, a portion of the valve body 22 projecting from the housing 10 is covered and protected by means of a boot 19 having a plurality of vent holes 19a formed at its rear end.

As shown in FIG. 2, a stepped axial hole 22a extends through the valve body 22 in the front-rear direction. A communication hole 22b is formed in the valve body 22 such that its rear end communicates with an intermediate stepped portion of the axial hole 22a and its front end communicates with the constant-pressure chamber R1. Further, a key attachment hole 22c is formed in the valve body 22 to generally perpendicularly intersect a front portion of the axial hole 22a. A key member 39 can be inserted into the key attachment hole 22c from the outer periphery of the valve body 22.

An input shaft 31, a plunger 32, a valve mechanism V, and filters 61 and 62 are assembled into the axial hole 22a. Further, an abutment member 33, a reaction member 34, and an output shaft 35 are assembled into the axial hole 22a to be coaxial with the input shaft 31 and the plunger 32. Moreover, a spring unit 40 is assembled into the axial hole 22a to be coaxial with the front end portion of the plunger 32 and the abutment member 33.

The input shaft 31, which can advance and retract with respect to the valve body 22, is articulately joined, at its spherical end portion 31a, to a support-connection portion 32c of the plunger 32, and is connected, at its rear end threaded portion 31b (see FIG. 1), to a brake pedal 110 via a yoke 111. Thus, the input shaft 31 receives a depressing force acting on the brake pedal 110, as an input Fa directed frontward.

The plunger 32 can abut, at its front shaft portion 32a, the reaction member 34 via the abutment member 33, and can abut, at its annular flange portion 32b formed at an intermediate portion thereof, the reaction member 34 via the spring unit 40. The annular flange portion 32b serves as a portion which receives the reaction force of an output Fb from the reaction member 34 via the spring unit 40. The front shaft portion 32a serves as a portion which receives the reaction force of the output Fb directly from the reaction member 34 without mediation of the spring unit 40. Further, an annular atmospheric valve seat 32d is formed at the rear end of the plunger 32. The annular atmospheric valve seat 32d is seated on and separated from an annular atmospheric control valve portion 51a of the valve mechanism V.

The abutment member 33 assumes the form of a stepped cylindrical column, so that it has a head portion 33a, which is greater in diameter than the front shaft portion 32a of the plunger 32. In a state in which the reaction member 34 and the output shaft 35 are not assembled to the valve body 22, the abutment member 33 can be attached to and detached from the spring unit 40 from the front of the valve body 22. In the assembled state as shown in the drawings, when the plunger 32 pushes the abutment member 33 frontward, the abutment member 33 comes into engagement with the reaction member 34, and transmits the reaction force of the output Fb from the reaction member 34 to the front shaft portion 32a of the plunger 32.

The reaction member 34 is a reaction rubber disk, and is assembled to a front end portion of the valve body 22 such that the reaction member 34 is accommodated within a front end portion of the axial hole 22a of the valve body 22 and its entire front face 34a engages with (abuts against) the end face 35c of the rear end portion of the output shaft 35. The rear face 34b of the reaction member 34 is engageable with an annular front face 41a1 of a first holding member 41 of the spring unit 40 and the front face of the head portion 33a of the abutment member 33. The reaction member 34 is supported in an axially movable manner by means of the inner wall of the axial hole 22a of the valve body 22 via a single annular projection 34c formed on the outer periphery of an intermediate portion of the reaction member 34.

The annular front face 41a1 of the first holding member 41 of the spring unit 40 and the front face of the head portion 33a of the abutment member 33 serve as portions which come into contact with the rear face 34b of the reaction member 34 and receive the reaction force of the output upon operation of the booster. The annular front face 41a1 has a pressure receiving area S1, and the front face of the head portion 33a of the abutment member 33 has a pressure receiving area S2.

The output shaft 35, together with the reaction member 34, is assembled into the front end portion of the axial hole 22a of the valve body 22 such that the output shaft 35 can move in the front-rear direction. As shown in FIG. 1, the front end rod portion 35a, which is attached to the tip end of the output shaft 35, is in engagement with an engagement portion of the piston 102 of the brake master cylinder 100 such that the output shaft 35 can push and move the piston 102. During braking operation, the output shaft 35 transmits to the reaction member 34 the reaction force received from the piston 102 of the brake master cylinder 100.

Figure 5:
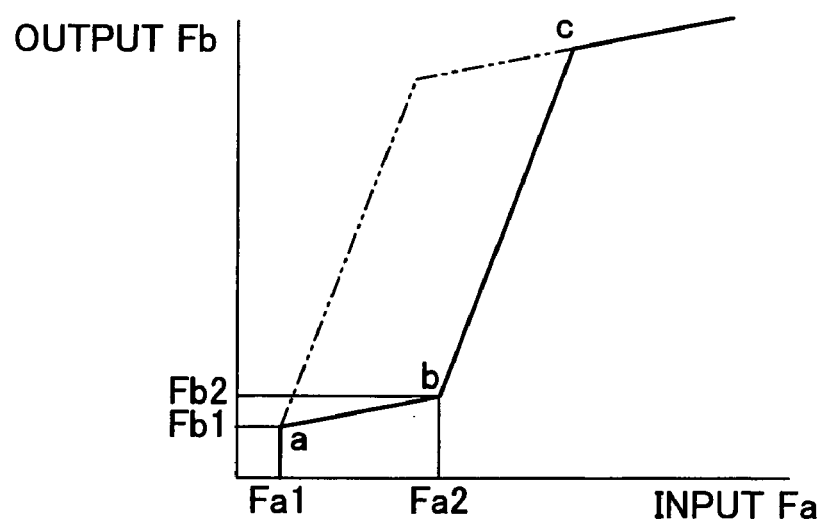
FIG. 5 is a graph showing the input-output characteristic of the vacuum-operated booster shown in FIG. 1.

A plate spring 36, serving as a plate-shaped elastic member, is interposed between the output shaft 35 and the valve body 22. The plate spring 36 is a reaction restricting member which elastically restricts transmission of the reaction force of the output Fb generated at the output shaft 35 to the reaction member 34 when the output Fb of the output shaft 35 is equal to or less than a set value Fb1. An inner peripheral portion of the plate spring 36 is in engagement with the output shaft 35 via a clip 37, and an outer peripheral portion of the plate spring 36 is in engagement with the front end of the valve body 22. Thus, at the beginning of operation of the vacuum-operated booster, the plate spring 36 functions, whereby a jumping output characteristic as shown in FIG. 5 is obtained in which the output Fb increases by a predetermined amount Fb1 without any increase in the input Fa. Therefore, the vacuum-operated booster can provide good operation feeling.

The key member 39 has a function of restricting the frontward/rearward movement of the plunger 32 with respect to the valve body 22 of the power piston 20, as well as a function of defining a limit regarding rearward movement of the power piston 20 with respect to the housing 10. The key member 39 is assembled to the power piston 20 and the plunger 32 to be relatively movable in the axial direction of the power piston 20.

The valve mechanism V includes the above-mentioned annular atmospheric control valve portion 51a, which can be seated on and separated from the annular atmospheric valve seat 32d formed on the plunger 32, and can establish and break communication between the variable-pressure chamber R2 and the atmosphere. The valve mechanism V also includes an annular negative-pressure control valve portion 51b, which can be seated on and separated from a negative-pressure valve seat 22e formed to correspond to the communication hole 22b of the valve body 22, and can establish and break communication between the constant-pressure chamber R1 and the variable-pressure chamber R2.

The annular atmospheric control valve portion 51a and the annular negative-pressure control valve portion 51b are integrally formed on a tubular valve body 51, and urged or biased toward the annular atmospheric valve seat 32d and the negative-pressure valve seat 22e (toward the front) by means of a spring 52. Notably, the tubular valve body 51 is urged forward by means of a spring 53, which is in engagement with a stepped portion of the input shaft 31 via a retainer 54, whereby the valve body 51 is held at a predetermined position (stepped portion) within the axial hole 22a of the valve body 22.

By virtue of the above-described structure of the valve mechanism V, the variable-pressure chamber R2 can communicate with the constant-pressure chamber R1 or the atmosphere in accordance with the movement in the front-rear direction of the input shaft 31 and the plunger 32 with respect to the valve body 22. That is, when the input shaft 31 and the plunger 32 shown in FIGS. 1 to 3 move forward with respect to the valve body 22, whereby the annular negative-pressure control valve portion 51b is seated on the negative-pressure valve seat 22e and the annular atmospheric valve seat 32d is separated from the annular atmospheric control valve portion 51a, communication between the variable-pressure chamber R2 and the constant-pressure chamber R1 is broken, and communication between the variable-pressure chamber R2 and the atmosphere is established. At this time, air flows into the variable-pressure chamber R2 via the vent holes 19a of the boot 19, the filters 61 and 62, the interior of the valve body 51, the clearance between the annular atmospheric valve seat 32d and the annular atmospheric control valve portion 51a, a through hole 22f (see FIG. 2) and the key attachment hole 22c provided in the valve body 22, etc.

In a state as shown in FIGS. 1 to 3 in which the annular negative-pressure control valve portion 51*b* is separated from the negative-pressure valve seat 22*e* and the annular atmospheric valve seat 32*d* is seated on the annular atmospheric control valve portion 51*a*, communication between the variable-pressure chamber R2 and the atmosphere is broken, and communication between the variable-pressure chamber R2 and the constant-pressure chamber R1 is established. At this time, air is sucked from the variable-pressure chamber R2 to the constant-pressure chamber R1 via the key attachment hole 22*c* and the through hole 22*f* provided in the valve body 22, the clearance between the annular negative-pressure control valve portion 51*b* and the negative-pressure valve seat 22*e*, the communication hole 22*b*, etc.

Incidentally, in the vacuum-operated booster of the present embodiment, as shown in an enlarged scale in FIG. 3, the spring unit 40 is composed of a tubular first holding member 41 assembled to the front shaft portion 32*a* of the plunger 32; an annular second holding member 42 assembled to the outer circumference of a rear end portion 41*c* of the first holding member 41; and five Belleville springs 43 which are assembled to the outer circumference of an intermediate portion 41*b* of the first holding member 41 and which are held at a predetermined mounting load f1 (see FIG. 4) between the holding members 41 and 42.

The spring unit 40 constitutes a reaction force dividing mechanism in cooperation with the valve body 22, the plunger 32, the abutment member 33, etc. The reaction force dividing mechanism receives from the rear face of the reaction member 34 reaction force of the output Fb of the output shaft 35, and transmits the reaction force to the valve body 22 and the plunger 32 while dividing the reaction force therebetween. In a low-load servo region in which the output Fb of the output shaft 35 is not greater than a set value Fb2, the reaction force dividing mechanism transmits all the reaction force of the output Fb only to the plunger 32. In a high-load servo region in which the output Fb of the output shaft 35 is greater than the set value Fb2, the reaction force dividing mechanism transmits the reaction force of the output Fb to the valve body 22 and the plunger 32 while dividing the same at a set ratio (S1:S2).

The first holding member 41 has an annular front end portion 41*a* which has a diameter greater than that of the second holding member 42 and approximately equal to that of the reaction member 34 and which comes into contact with the rear end face 34*b* of the reaction member 34; the cylindrical, tubular intermediate portion 41*b* which is smaller in diameter than the second holding member 42 and which supports the Belleville springs 43 and the second holding member 42 assembled to the outer circumference thereof; and the annular rear end portion 41*c* which retains the second holding member 42. The first holding member 41 is fitted onto the front shaft portion 32*a* of the plunger 32, so that the first holding member 41 can move telescopically in the axial direction. The first holding member 41 is engageable with the reaction member 34 at a front face 41*a*1 of the front end portion 41*a*, which is larger in diameter than the second holding member 42, and is also engageable with a stepped portion 22*g* of the valve body 22 at a rear face 41*a*2 of an outer peripheral portion of the front end portion 41*a*.

The second holding member 42 is assembled, in an axially movable manner, to the outer circumference of the rear end portion 41*c* of the first holding member 41 via the front end portion 42*a* of the second holding member 42, and is retained at the rear end portion 41*c* by means of plastically deforming radially outward the rear end of the rear end portion 41*c*. Further, the front face of the front end portion 42*a* of the second holding member 42 is in contact with the Belleville springs 43, whereby the second holding member 42 is urged or biased rearward. A rear end portion 42*a* of the second holding member 42 projects rearward from the first holding member 41 and is in engagement with the annular flange portion 32*b* of the plunger 32.

Figure 4:
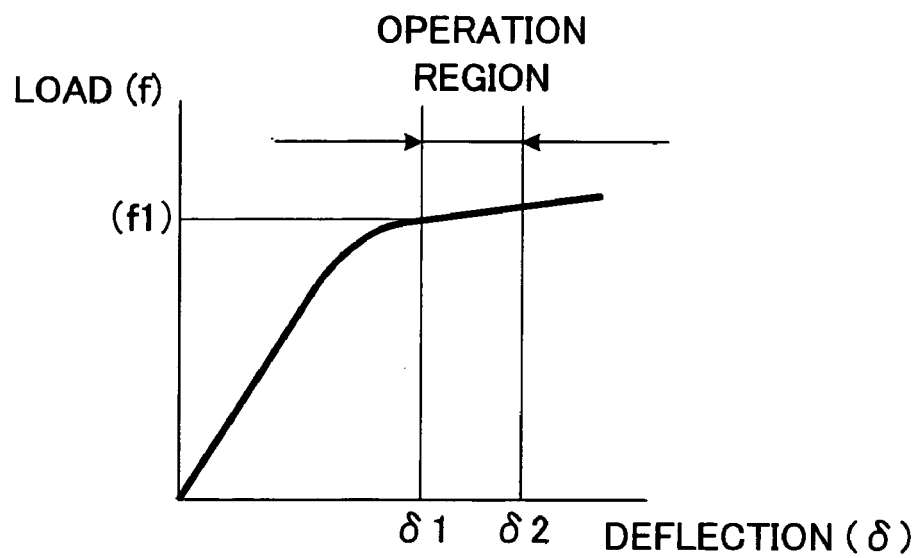
FIG. 4 is a graph showing the characteristic of Belleville springs shown in FIGS. 1 to 3.

The five Belleville springs 43 are assembled such that their convex sides alternately face opposite axial directions (front-rear direction), and are elastically deformable in the axial direction. The Belleville springs 43 have a spring characteristic (relation between load f and deflection δ) as shown in FIG. 4. In a state shown in FIGS. 1 to 3 (unoperated state), the deflection δ is at a predetermined value δ1, and the load f is at a predetermined value (mounting load) f1. When the reaction force which is transmitted from the reaction member 34 to the front end portion 41*a* of the first holding member 41 exceeds the above-mentioned predetermined value f1 upon operation of the booster, the Belleville springs 43 increases the deflection δ to a value δ2 of FIG. 4, to thereby permit rearward movement of the first holding member 41. As a result, the first holding member 41 moves rearward while axially deflecting or compressing the Belleville springs 43, and comes into engagement with the stepped portion 22*g* of the valve body 22 to be received thereby.

In the vacuum-operated booster of the above-described embodiment, when the depressing force acting on the brake pedal 110 is small, and the input shaft 31, the plunger 32, the abutment member 33, the spring unit 40, etc., are advanced with a small input Fa (when the booster is in a low-load servo region in which the input Fa is not greater than a set value Fa2 and the output Fb is not greater than a set valve Fb2), the reaction force transmitted from the reaction member 34 to the spring unit 40 is small, so that the first holding member 41 of the spring unit 40 does not retreat to a point at which it comes into engagement with the stepped portion 22*g* of the valve body 22.

Therefore, in such a state, the plunger 32 receives the reaction force of the output Fb from the reaction member 34 via the abutment member 33, and also receives the reaction force of the output Fb from the reaction member 34 via the spring unit 40, so that all the reaction force of the output Fb of the output shaft 35 is transmitted to the plunger 32. Accordingly, in that state, the booster operates at a low servo ratio of (S1+S2)/(S1+S2); i.e., 1, and, the output Fb increases at a small rate with respect to the input Fa (between point a and point b in the characteristic curve of FIG. 5). In a vehicle which is equipped with the above-described vacuum-operated booster and employs a brake system which increases electric power regeneration efficiency, the above-described operation enables the electric power regeneration efficiency to be increased to a sufficient level.

When the depressing force acting on the brake pedal 110 increases and the input shaft 31, the plunger 32, the abutment member 33, the spring unit 40, etc., are advanced with a large input (when the booster is in a high-load servo region in which the input Fa is greater than the set value Fa2 and the output Fb is greater than the set valve Fb2), the reaction force transmitted from the reaction member 34 to the spring unit 40 increases, so that the first holding member 41 of the spring unit 40 retreats while deflecting the Belleville springs 43 up to the point at which it comes into engagement with the stepped portion 22*g* of the valve body 22.

Therefore, in such a state, the plunger 32 does not receive the reaction force of the output Fb from the reaction member 34 via the spring unit 40, although it receives the reaction force of the output Fb from the reaction member 34 via the abutment member 33, so that the reaction force of the output Fb of the output shaft 35 is transmitted to the valve body 22 and the plunger 32 while being divided therebetween at the set ratio (S1:S2). Accordingly, in that state, the booster operates at a high servo ratio of (S1+S2)/S2, and the output Fb increases at a large rate with respect to the input Fa (between point b and point c in the characteristic curve of FIG. 5).

When the brake pedal 110 is operated rapidly during the above-described high-input operation, the input shaft 31, the plunger 32, the abutment member 33, etc. advance in relation to the valve body 22. The reaction force generated at this time is divided into a first fraction transmitted from the reaction member 34 to the plunger 32 via the abutment member 33 and a second fraction transmitted from the reaction member 34 to the plunger 32 via the Belleville springs 43 of the spring unit 40. However, the reaction force transmitted from the Belleville springs 43 in this case is small, because, as shown in FIG. 4, the operation region of the Belleville springs 43 is set to fall within a high load-low spring constant region (a region in which a change in load f with respect to a change in deflection δ is small). Therefore, in this case, the plunger 32 can be advanced over a large distance with respect to the valve body 22 in response to the rapid operation of the brake pedal 110. Therefore, introduction of air from the valve mechanism V to the variable-pressure chamber R2 can be made easier through increasing the clearance (air intake valve opening) between the annular atmospheric valve seat 32d and the annular atmospheric control valve portion 51a, whereby an operation response at the time of rapid operation in the high servo ratio region where the load f of the Belleville springs 43 increases can be enhanced.

In the vacuum-operated booster of the present embodiment, the first holding member 41 of the spring unit 40 is formed into a tubular shape, and is fitted onto the front shaft portion 32a of the plunger 32 in an axially movable condition. Further, the second holding member 42 of the spring unit 40 is attached to the outer circumference of the rear end portion of the first holding member 41 such that the second holding member 42 is movable in the axial direction and is prevented from coming off the rear end portion. Therefore, the Belleville springs 43—which are assembled to the outer circumference of the tubular portion of the first holding member 41 and are held at the predetermined load f1 between the holding members 41 and 42—do not engage, at their intermediate portions, with the second holding member 42 or the plunger 32, which engagement would otherwise occur when the first holding member 41 axially moves while deflecting the Belleville springs 43. Accordingly, the present vacuum-operated booster can prevent generation of noise or operation failure stemming from the catching or engagement of the Belleville springs 43, to thereby ensure silent and smooth operation.

In the vacuum-operated booster of the present embodiment, the second holding member 42 of the spring unit 40 is attached to the outer circumference of the rear end portion of the first holding member 41 such that the second holding member 42 is movable in the axial direction and is prevented from coming off the rear end portion. Further, the Belleville springs 43 are assembled to the outer circumference of the tubular portion of the first holding member 41 and are held at the predetermined load f1 between the holding members 41 and 42. This configuration enables the apparatus to be assembled in such a manner that after the Belleville springs 43 are assembled to the outer circumference of the tubular portion of the first holding member 41, the second holding member 42 is attached to the outer circumference of the rear end portion of the first holding member 41 such that the second holding member 42 is prevented from coming off the rear end portion. By virtue of this, the constituent members of the spring unit 40 can be unified, and thus, the easiness of assembly of the spring unit 40 can be enhanced.

In the vacuum-operated booster of the present embodiment, in a state in which the Belleville springs 43 have been assembled to the outer circumference of the tubular portion of the first holding member 41, and the second holding member 42 has been fitted onto the outer circumference of the rear end portion of the first holding member 41, the rear end of the first holding member 41 is plastically deformed radially outward so as to prevent the Belleville springs 43 and the second holding member 42 from coming off the first holding member 41, whereby the spring unit 40 is completed. Therefore, the structure of the spring unit 40 can be simplified, and the spring unit 40 can be fabricated at low cost.

In the vacuum-operated booster of the present embodiment, the front end portion of the plunger 32 is formed of the abutment member 33, which is a member separate from the remaining portion of the plunger 32, and the abutment member 33 is formed into the form of a stepped cylindrical column. The pressure receiving area S2, through which the plunger front end portion formed of the abutment member 33 receives reaction force from the reaction member 34, and the pressure receiving area S1, through which the first holding member 41 of the spring unit 40 receives reaction force from the reaction member 34, can be changed and set by merely changing the shape of the plunger front end portion formed of the abutment member 33. Therefore, the high servo ratio (S1+S2)/S2 obtained at the time of high input operation can be easily changed and set.

In the vacuum-operated booster of the present embodiment, the reaction member 34 is axially movable in contact with the inner wall of the axial hole 22a of the valve body 22 via the single annular projection 34c formed on the outer periphery of an intermediate portion of the reaction member 34. Therefore, axial movement of the reaction member 34 in relation to the inner wall of the axial hole 22a of the valve body 22 (operation in the low-load servo region) becomes smooth, whereby operation of the vacuum-operated booster in the low-load servo region can be made smooth. Notably, the number in the annular projection 34c is provided may be changed freely, and two or more annular projections 34c may be provided.

In the above-described embodiment, the Belleville springs 43 are employed as a spring which is held at a predetermined load between the two holding members 41 and 42 of the spring unit 40. However, a coil spring or rubber spring may be employed as a spring of the spring unit.

In the above-described embodiment, in a state in which the Belleville springs 43 have been assembled to the outer circumference of the tubular portion of the first holding member 41 of the spring unit 40, and the second holding member 42 has been fitted onto the outer circumference of the rear end portion of the first holding member 41, the rear end of the first holding member 41 is plastically deformed radially outward so as to prevent the Belleville springs 43 and the second holding member 42 from coming off the first holding member 41, whereby the spring unit 40 is completed. However, the configuration may be modified such that in a state in which the Belleville springs 43 have been assembled to the outer circumference of the tubular portion of the first holding member 41 of the spring unit 40, and the second holding member 42 has been fitted onto the outer circumference of the rear end portion of the first holding member 41, a clip is fitted and secured to the outer circumference of the rear end portion of the first holding member 41 so as to prevent the Belleville springs 43 and the second holding member 42 from coming off the first holding member 41.

In the above-described embodiment, the front end portion of the plunger 32 is formed of the abutment member 33, which is a member separate from the remaining portion of the plunger 32. However, the plunger 32 may be configured such that the front end portion of the plunger itself extends to the reaction member 34, and thus, the plunger receives reaction force directly from the reaction member 34.

What is claimed is:

1. A vacuum-operated booster comprising:
   a housing;
   a movable diaphragm dividing the interior of the housing into a constant-pressure chamber and a variable-pressure chamber;
   a valve body connected to the movable diaphragm and having an axial hole;
   a valve mechanism built in the axial hole and including an input shaft axially movable with respect to the valve body, a plunger connected to a front end portion of the input shaft, and a valve seat provided at a rear end portion of the plunger;
   a reaction member which is disposed in the axial hole to be axially movable with respect to the valve body and with which a front end portion of the plunger is engageable;
   an output shaft which is disposed in the axial hole to be axially movable and which comes into engagement, at its rear end portion, with a front face of the reaction member, an output being generated at the output shaft when an input is applied to the input shaft; and
   a reaction force dividing mechanism for transmitting reaction force of the output from a rear face of the reaction member to the valve body and the plunger, wherein the reaction force dividing mechanism transmits all the reaction force of the output of the output shaft only to the plunger in a low-load servo region in which the output of the output shaft is equal to or less than a set value, and transmits the reaction force to the valve body and the plunger while dividing the reaction force therebetween at a set ratio in a high-load servo region in which the output of the output shaft is greater than the set value.

2. A vacuum-operated booster according to claim 1, further comprising a reaction restricting member which is interposed between the output shaft and the valve body so as to elastically restrict transmission of the reaction force of the output generated at the output shaft to the reaction member when the output of the output shaft is equal to or less than a set value.

3. A vacuum-operated booster according to claim 2, wherein the reaction restricting member is a plate-shaped elastic member provided between the output shaft and a front end portion of the valve body.

4. A vacuum-operated booster according to claim 1, wherein the reaction force dividing mechanism includes a spring unit which is disposed on the outer circumference of the front end portion of the plunger and axially movable with respect to the valve body; and the spring unit includes a tubular first holding member assembled to a front shaft portion of the plunger so as to be telescopically movable in the axial direction, the first holding member having a front end portion which comes into engagement with the reaction member and is equal in diameter to the reaction member; a second holding member assembled, in an axially movable manner, to the outer circumference of a rear end portion of the first holding member such that the second holding member is prevented from coming off the rear end portion, the second holding member having a rear end portion which projects rearward from the first holding member and comes into engagement with a portion of the plunger; and a spring assembled to the outer circumference of the tubular portion of the first holding member and held at a predetermined load between the first and second holding members, wherein when the reaction force transmitted from the reaction member to the front end portion of the first holding member exceeds the load of the spring, the first holding member axially moves while compressing the spring, and comes into engagement with a stepped portion of the valve body.

5. A vacuum-operated booster according to claim 4, wherein the spring is a plurality of stacked Belleville springs.

6. A vacuum-operated booster according to claim 4, wherein the first holding member, the second holding member, and the spring of the spring unit are united in such a manner that the spring is assembled to the outer circumference of the tubular portion of the first holding member; the second holding member is fitted onto the outer circumference of the rear end portion of the first holding member; and the rear end of the first holding member is plastically deformed radially outward so as to prevent the spring and the second holding member from coming off the first holding member.

7. A vacuum-operated booster according to claim 4, wherein the front end portion of the plunger is formed of a different member separate from the remaining portion of the plunger, the different member being formed into the form of a stepped cylindrical column.

8. A vacuum-operated booster according to claim 1, wherein the reaction member is supported in an axially movable manner by means of the inner wall of the axial hole of the valve body via a single annular projection formed on the outer periphery of the reaction member.

* * * * *